Aug. 5, 1924.
W. DAVIS
COMBINED ACCELERATOR AND BRAKE CONTROLLING MECHANISM
Filed May 5, 1923
1,503,525
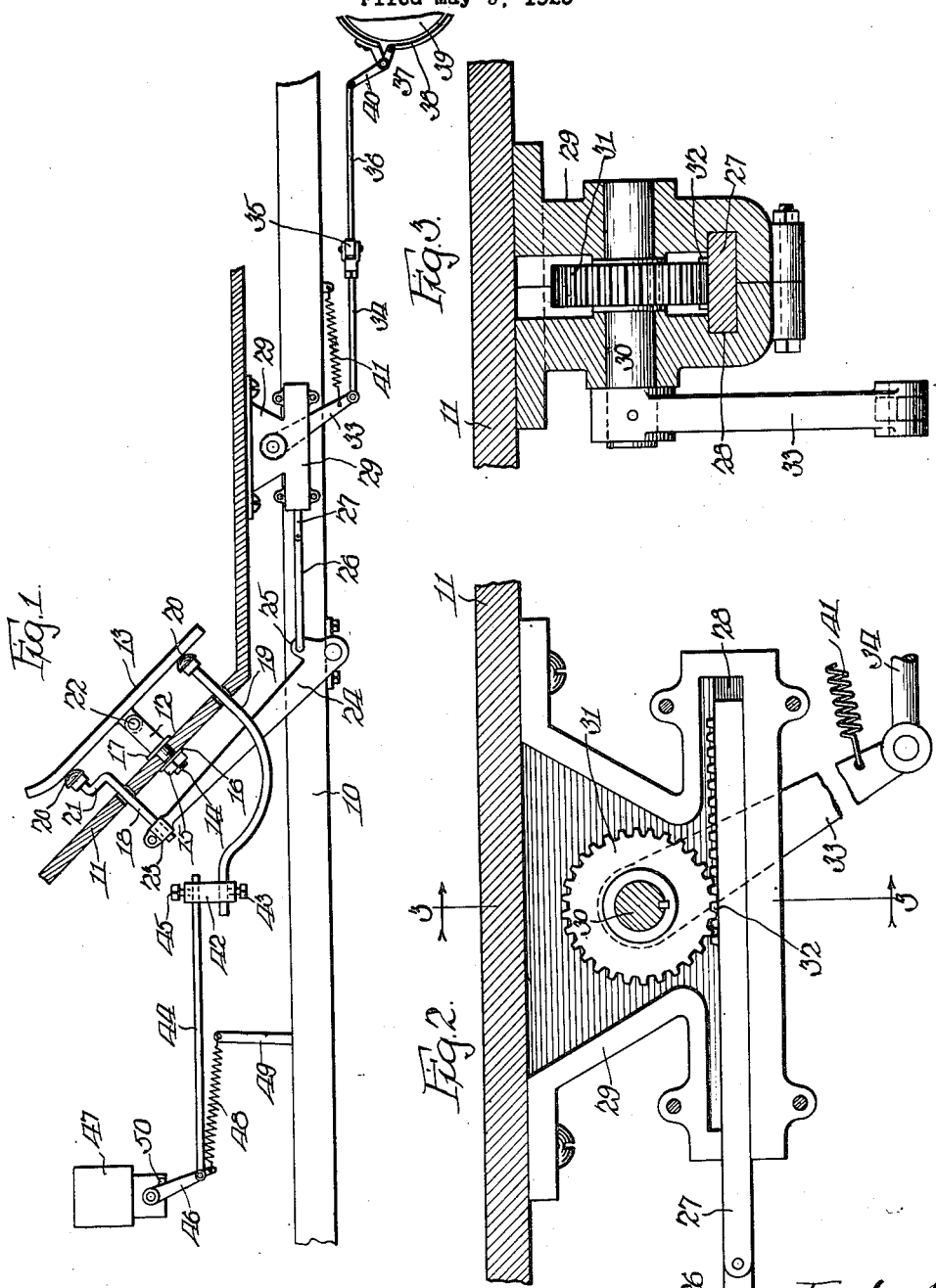

Patented Aug. 5, 1924.

1,503,525

UNITED STATES PATENT OFFICE.

WILLIAM DAVIS, OF CHICAGO, ILLINOIS.

COMBINED ACCELERATOR AND BRAKE CONTROLLING MECHANISM.

Application filed May 5, 1923. Serial No. 636,950.

*To all whom it may concern:*

Be it known that I, WILLIAM DAVIS, a citizen of the United States, and a resident of Chicago, in the county of Cook and State of Illinois, have invented certain new and useful Improvements in a Combined Accelerator and Brake Controlling Mechanism, of which the following is a specification.

This invention is somewhat similar to that disclosed in my co-pending application for patent for improvements in combined accelerator and brake controlling mechanism, Serial Number 626,059, filed the 19th day of March, 1923, and like the invention of said application, relates, generally, to improvements in means for operating valved and pressure or friction applying devices whereby operative parts connected to said devices may be so actuated by said means as to properly and accurately control the action or operation thereof, but has particular relation to controlling means for accelerators and brakes of motor driven vehicles, and especially those of automobiles.

The invention has for one of its objects, the provision of a controlling mechanism of the above named general character, which shall be of such construction, arrangement and operation of its parts that a unit, or unitary device, is afforded for controlling the accelerator and brake, or their equivalents, without the necessity of employing a separate device for each, as has heretofore been the general practice.

Other objects of the present invention are the same as those set forth in my aforesaid pending application, and in addition thereto, the provision of means whereby the movement of the foot rest or pedal of the mechanism in operating either the accelerator or brake will be equalized, or such that substantially the same degree of movement of the said foot rest for operating the accelerator, which is very slight, will be sufficient for the operation of and for applying the brake with the desired amount of pressure.

Various other objects and advantages of the invention will become obvious from the following description and explanation, which will be more readily understood when read in conjunction with the accompanying drawing, in which an embodiment of which the invention is susceptible is illustrated, it being understood that changes and modifications may be resorted to without departing from the spirit of the invention, so long as they come within the scope of the appended claims forming a part hereof.

Referring to the drawing,—

Figure 1 is a view partly in section and partly in elevation of the front part of an automobile frame and its body, showing a controlling mechanism embodying the invention mounted thereon with its parts in their normal positions.

Fig. 2 is a greatly enlarged view partly in section and partly in elevation showing a portion of the frame of an automobile with the housing for a rack and pinion forming a part of the mechanism mounted thereon, and Fig. 3 is a cross-sectional view taken on line 3—3 of Fig. 2 looking in the direction indicated by the arrows.

Like numerals of reference refer to corresponding parts throughout the different views of the drawing.

The reference numeral 10 designates a portion of the chassis or frame of an automobile on which is mounted in the usual or any well known way the body of the automobile, the front portion 11 only of which is shown in the drawings.

Mounted on this front portion 11 or foot rest part of the automobile is a standard 12 which supports the foot rest or pedal 13 of the mechanism. The standard 12 is by preference provided at its lower end with a reduced and screw threaded portion 14 which is extended through a suitable opening in the body 11 and has secured on its lower portion a nut 15 and a washer 16 used in conjunction with an annular flange 17 on the standard 12 at the upper end of its reduced portion 14 for rigidly securing the standard on the support 11 thereof. The foot rest 13 is pivotally mounted on the upper end of the standard 12 for longitudinally tiltable movement of said rest.

Mounted for reciprocation or for back and forth movement through suitable openings in the portion 11 of the automobile body rearwardly and in front of the standard 12 at suitable distances therefrom, are controlling rods 18 and 19 each of which has mounted or is provided on its upper end with a rounded knob 20 to contact with the lower surface of the foot rest 13 for the purpose of reducing friction incident to the contact of said parts. The controlling rod 18 is by preference laterally offset as at 21 above the portion 11 of the automobile body so that its knob 20 may be positioned at substantially the same distance from the fulcrum 22 of the foot rest as is the knob 20 of the accelerator rod 19, which last named rod is by preference curved as shown in Fig. 1 of the drawing. The lower end of the rod 18 is fixedly secured by means of a clamp 23 or otherwise to the front end of the longer arm of a bell crank lever 24, which lever is fulcrumed on a suitable support below the body portion 11 and usually on the frame 10 of the automobile. The other arm 25 of the lever 24 has pivotally connected thereto one end of a link 26 the other end of which is connected to one end of a rack bar 27 which bar is slidably mounted in a horizontally disposed guideway 28 of a housing 29 which is secured to the lower surface of the body portion 11 of the automobile so as to lie longitudinally with respect thereto as is clearly shown in Figs. 1 and 2 of the drawing.

Transversely journaled on the housing 29 is a shaft 30 on which is mounted for rotation therewith a pinion 31 adapted to mesh with the teeth 32 of the rack bar 27 so that in the movement of the rack bar said pinion will be partially rotated. As shown in Fig. 3, the shaft 30 is extended through one side of the housing 29 and has fixed on said extended portion a crank 33 which extends downwardly and has pivotally connected to its lower end one end of a link 34 the other end of which is pivotally connected to the equalizing bar 35 at about the middle of said bar. Extended rearwardly and horizontally from each end of the equalizing bar 35 is a brake operating rod 36 each of which is connected to a brake band operating mechanism designated as a whole by the reference numeral 37, which mechanisms may be of the ordinary or any well known type, one of the same being shown diagrammatically in Fig. 1 of the drawing.

As is well known, the operating mechanisms for the brake bands are each usually provided with a spring to normally hold the band 38 out of contact with the brake drum 39 and in such a way that the lever 40 to which one end of the brake operating rod 36 is secured, will be normally held in about the position shown in Fig. 1 of the drawing. The action of the spring for thus positioning the brake band and said lever as above mentioned, is usually sufficient to cause the bell crank lever 24 and the controlling rod 18 to normally assume the positions shown in Fig. 1 of the drawing. However, to insure the return movement of the lever 24 and controlling rod 18 to their normal positions after they have been depressed by the foot rest 13, a coil spring 41 connected at one of its ends to the crank 33 and at its other end to the frame 10 rearwardly of said crank, may be employed.

Mounted on the lower or front end of the controlling or accelerator rod 19, is a coupling 42 through a transverse opening in the lower portion of which the rod 19 is extended and secured in position by means of a set screw 43 seated in the lower portion of said coupling. The upper portion of this coupling is provided with a transverse opening in which one end of a link 44 is secured by means of a set screw 45 which link is operatively connected at its other end to the throttle valve 46 of a carburetor 47 of a well known type, which carburetor is located and supported in the usual place or manner on the automobile.

As is well known, the throttle valve operating mechanisms of the ordinary construction, are each equipped with a spring for normally closing the throttle valve, the action of which spring is sufficient to restore the parts 19, 44, and 46 to their normal positions as shown in Fig. 1 of the drawing, after they have been actuated by the proper movement of the foot rest 13 and after pressure has been removed from said rest. However, to insure the return of said parts to their normal positions, a coil spring 48 secured at one of its ends to the valve arm 46 and at its other end to a projection 49 on the frame 10 rearwardly of said arm, may be employed.

From the foregoing and by reference to the drawing, it will be readily understood and clearly seen that by my improvements a unitary device for controlling the accelerator and for controlling the brake mechanism, is furnished, for it is apparent that by placing the foot of the operator on the tiltable member or foot rest 13, either of the controlling rods 18 or 19 can be depressed by tilting the member 13 in the proper direction and that in so doing the other rod will be maintained in its normal position by reason of its spring actuated construction. The rod 19 is restricted in its rearward or upward movement by reason of a stop member 50 mounted on the carburetor 47 in such a manner that the valve arm 46 will contact therewith in the retraction of the members which operate the throttle valve.

As an example of the operation of the device, to open the throttle valve of the carburetor 47, so as to accelerate the speed of the engine, the tiltable member 13 can be tilted rearwardly and downwardly to the desired degree so as to open the throttle valve to more or less extent. On the other hand, if it is desired to apply the brakes of the automobile, the tiltable member 13 can be tilted forwardly and downwardly, which will depress the rod 18 and the longer arm of the bell crank lever 24, which portions will cause forward movement of the rack bar 27 and also forward movement of the crank 33 by reason of the engagement of the teeth 32 of the rack bar with the teeth of the pinion 31, the gear ratio of which is such as to cause, by a very slight forward movement of the rack bar 27, a much greater forward movement of the lower end of the crank 33 through which the same degree of movement will be transmitted through the connections 34 and 36 to the brake band operating mechanisms, for the application of said bands to their respective drums when it is desired to stop the automobile or retard its movements.

By employing the coupling 42 for uniting the rods 19 and 44, it is obvious that these rods can be adjusted with respect to one another so as to accommodate for the varying distances between the throttle valve and the foot rest or tiltable member which occurs in automobiles of different makes.

By providing the controlling rod 18 with the lateral offset 21, it is manifest that the opening in the foot portion 11 of the body of the automobile usually employed for the reception and operation of the brake pedal, which opening is usually located nearer the standard 12 than the opening through which the rod 19 is extended, the knob of the rod 18 will be in position to contact with the foot member 13 at the same distance from the fulcrum 22 thereof as the knob 20 on the other operating rod.

As it requires very slight movement of the member 13 to operate the accelerator, and as it is desirable to operate the brake applying mechanism with about the same degree of movement of the tiltable member, it is apparent that the inclusion in the connection leading from the controlling rod 18 to the brake band operating mechanism 37, of the rack bar and co-acting pinion and crank, will afford such means.

Having thus fully described by invention, what I claim as new and desire to secure by Letters Patent is:—

1. In a device of the class described, the combination with a supporting standard, of a member tiltably mounted thereon, of controlling rods mounted for back and forth movement with respect to said member on opposite sides of said standard and adapted to be moved in one direction by said tiltable member, a suitably fulcrumed bell crank lever connected near the free end of its longer arm to one of said controlling rods, a co-operating rack bar and pinion mounted adjacent the fulcrum of said lever, a connection uniting the rack bar and the shorter arm of said lever, a crank on the shaft of said pinion, and means operatively connecting the outer portion of said crank to a part to be operated thereby.

2. In a device of the class described, the combination with a body and frame of an automobile, of a supporting standard mounted on and extended upwardly from said body, a member tiltably mounted on said standard, controlling rods extended through a guide opening in the body for back and forth movement with respect to said member on opposite sides of said standard and adapted to be moved in one direction by said tiltable member, a bell crank lever fulcrumed below said body and connected near the free end of its longer arm to one of said controlling rods, a co-operating rack and pinion mounted on the body adjacent the fulcrum of said lever, a connection uniting the rack bar to the shorter arm of said lever, a crank on the shaft of said pinion, means operatively connecting the outer portion of said crank to the equalizing bar of the brake band operating mechanism of the automobile, and means operatively connecting the other controlling rod to the throttle valve of the carburetor of the automobile.

WILLIAM DAVIS.